United States Patent
Cohen-Or

(10) Patent No.: US 6,307,567 B1
(45) Date of Patent: Oct. 23, 2001

(54) MODEL-BASED VIEW EXTRAPOLATION FOR INTERACTIVE VIRTUAL REALITY SYSTEMS

(75) Inventor: Daniel Cohen-Or, Hod Hasharon (IL)

(73) Assignee: RichFX, Ltd., Bnai Brak (IL)

( * ) Notice: Subject to any disclaimer, the term of this patent is extended or adjusted under 35 U.S.C. 154(b) by 0 days.

(21) Appl. No.: 08/995,568

(22) Filed: Dec. 22, 1997

(30) Foreign Application Priority Data

Dec. 29, 1996 (IL) .................................................. 119928

(51) Int. Cl.$^7$ .................................................. G06T 17/00

(52) U.S. Cl. .................................................. 345/619; 345/473

(58) Field of Search .................................................. 345/433, 419, 345/474, 355, 357, 329

(56) References Cited

U.S. PATENT DOCUMENTS

| | | | | |
|---|---|---|---|---|
| 5,276,785 | * | 1/1994 | Mackinlay et al. | 345/427 |
| 5,325,472 | * | 6/1994 | Horiuchi et al. | 345/427 |
| 5,394,521 | * | 2/1995 | Henderson, Jr. et al. | 345/357 |
| 5,442,734 | * | 8/1995 | Murakami et al. | 345/427 |
| 5,613,048 | * | 3/1997 | Chen et al. | 345/427 |
| 5,682,506 | * | 10/1997 | Corby, Jr. et al. | 345/419 |
| 5,737,533 | * | 4/1998 | De Hond | 345/357 |
| 5,764,235 | * | 6/1998 | Hunt et al. | 345/329 |
| 5,793,382 | * | 8/1998 | Yerazunis et al. | 345/474 |
| 5,808,613 | * | 9/1998 | Marrin et al. | 345/357 |
| 5,808,614 | * | 9/1998 | Nagahara et al. | 345/355 |

OTHER PUBLICATIONS

T.A. Funkhouser et al., "Adaptive Display Algorithm for Interactive Frame Rates During Visualization of Complex Virtual Environments", Computer Graphics (SIGGRAPH '93 Proceedings), pp. 247–254, Aug. 1993.

P.W.C. Maciel et al., "Visual Navigation of Large Environments Using Textured Clusters", 1995 Symposium on Interactive 3D Graphics, pp. 95–102, Apr. 1995.

J. Shade et al., "Hierarchical Image Caching for Accelerated Walkthroughs of Complex Environments", Computer Graphics (SIGGRAPH '96 Proceedings).

G. Schauf ler et al., "A Three Dimensional Image Cache for Virtual Reality", Eurographics '96, Computer Graphics Forum, vol. 15, No. 3, pp. 227–235, 1996.

D.G. Aliaga, "Visualization of Complex Models Using Dynamic Texture–Based Simplification", Proceedings of Visualization 96).

S.E. Chen et al., "View Interpolation for Image Synthesis", Computer Graphics (SIGGRAPH '93 Proceedings), pp. 279–288, Aug. 1993.

T. Kaneko et al., "View Interpolation with Range Data for Navigation Applications", Computer Graphics International, pp. 90–95, Jun. 1996.

S.M. Seitz et al., "View Morphing", Computer Graphics (SIGGRAPH '96 Proceedings).

P.E. Debevec et al., "Modeling and Rendering Architecture from Photographs: A Hybrid Geometry– and Image–Based Approach", Computer Graphics (SIGGRAPH '96 Proceedings).

(List continued on next page.)

Primary Examiner—Cliff N. Vo
(74) Attorney, Agent, or Firm—Fish & Neave; Joel Weiss

(57) ABSTRACT

A method by which a client and a server cooperate to render views of a virtual reality world within which a user of the client navigates. The server sends the client a reference view and a model to use to extrapolate the reference view in response to the user's virtual movement. The client sends the server a record of the user's virtual movement. Both the client and the server perform the model-based extrapolation of the reference view. The server also performs an exact update of the reference view. When the extrapolated reference view deviates too much from the updated reference view, the server sends the client the difference between the extrapolated and updated reference views, so that the client can update its reference view.

45 Claims, 2 Drawing Sheets

OTHER PUBLICATIONS

M. Levoy, "Polygon–Assisted JPEG and MPEG Compression of Synthetic Images", Computer Graphics (SIGGRAPH '95 Proceedings), pp. 21–28, Aug. 1995.

M. Agrawala et al., "Model–Based Motion Estimation for Synthetic Animations", Proc. ACM Multimedia '95.

D.S. Wallach et al., "Accelerated MPEG Compression of Dynamic Polygonal Scenes", Computer Graphics (SIGGRAPH '94 Proceedings), pp. 193–197, Jul. 1994.

A.C. Beers et al., "Rendering from Compressed Textures", Stanford University.

Mark, et al, "Post–Rendering Image Warping for Latency Compensation UNC–CH Computer Science Technical Report #96–020", Symposium on Interactive 3D Graphics, Providence, RI, Apr. 28–30, 1997.

Y. Mann et al., "Selective Pixel Transmission for Navigating in Remote Virtual Environments", Eurographics '97, vol. 16, No. 3 (1997).

* cited by examiner

MODEL-BASED VIEW EXTRAPOLATION FOR INTERACTIVE VIRTUAL REALITY SYSTEMS

PRIORITY CLAIMED

This application claims priority from Application No. 119928, entitled "Model-Based View Extrapolation For Interactive Virtual Reality Systems," dated Dec. 28, 1996, and filed in Israel.

BACKGROUND OF THE INVENTION

1. Field of Invention

The present invention relates to interactive networks and, more particularly, to a network in which a server interactively provides views of a virtual reality world to a client.

2. Description of Related Art

Unlike text-based media, video must be transmitted in a predictable, synchronized manner, and requires a guaranteed quality of service, with guaranteed bandwidth and guaranteed bounds on other properties such as latency and jitter. Protocols that support guaranteed quality-of-service media connections soon will be provided by ATM-based networks, or by other technologies such as FDDI and Fast Ethernet. Such protocols establish a virtual connection between a sender (a multimedia server) and a receiver (a client) provided that sufficient resources can be reserved along the path to support the minimum level of quality of service required by the connection.

Photo-realistic virtual reality applications are similar to video-based real-time applications, but provide full interaction. In many virtual reality systems, the user must have a real perception of the environment that is being explored or discovered, and a smooth interaction with the environment. In an interactive web-system scenario, the client carries the virtual camera and navigates through the virtual environment. The server constantly receives details regarding the client camera position and orientation, as well as its activities which may modify the virtual environment. All the information concerning the entire setting is held at the server. According to the client movement, the server updates the client with essential data which enables the generation of new views.

Time lag and low quality images are the main reasons for a decrease in the sense of reality. High fidelity and photo-realism are achieved by using a fully textured (photo-mapped) environment. Today we are witnessing a rapidly increasing presence of 3D virtual worlds on the world wide web, described using a virtual reality modeling language (VRML). However, the interaction with remote virtual environments on the web is still extremely limited. The common approach is to first download the entire VRML 3D world to the client. Then the client renders the scene locally. This approach is successful as long as the environment is not too complex; otherwise it causes a critical penalty in the downloading time. This prevents the use of photo-textures, which are necessary for a photo-realistic impression. It should be emphasized that the downloading time is required for every change of session, for example, if the user moves to an upper floor in a shopping application or to another planet in a video game.

To avoid the above drawbacks, an alternative approach has been suggested in which the server computes the new views and sends them compressed to the client. Although each image is compressed (e.g., JPEG), the volume of transmission is still quite large and would either require an expensive bandwidth or lower the quality of the images. Video compression techniques such as MPEG, which exploit temporal data redundancy, are based on inter-frame dependencies and may be compressed on-line, but with a time lag which prohibits real-time feedback.

There is thus a widely recognized need for, and it would be highly advantageous to have, a method for providing views of a remote complex virtual reality world, at the client of an interactive server-client system, fast enough to preserve the illusion of virtual reality.

In visual navigation applications there is always a need to balance the imaging quality and the frame rate. In interactive real-time systems, one is required to maintain a user-specified minimal frame rate. T. A. Funkhouser and C. H. Séquin (Adaptive display algorithm for interactive frame rates during visualization of complex virtual environments, *Computer Graphics* (*SIGGRAPH '93 Proceedings*), pp. 247–254, August 1993) proposed an algorithm that adjusts the image quality adaptively by choosing the level-of-detail and rendering algorithm according to its estimated rendering cost. P. W. C. Maciel and P. Shirley (Visual navigation of large environments using textured clusters, 1995 *Symposium on Interactive 3D Graphics*, pp. 95–102, April 1995) suggested the use of an imposture to trade speed for quality. An imposture must be faster to draw than the true model while visually resembling the real image. Textures mapped on simplified models are a common form of imposture. J. Shade, D. Lischinski, D. H. Salesin, J. Snyder and T. Derose (Hierarchical image caching for accelerated walkthroughs of complex environments, *Computer Graphics* (*SIGGRAPH '96 Proceedings*)), G. Schauffler and W. Sturzlinger (A three dimensional image cache for virtual reality, *Eurographics '96, Computer Graphics Forum* Vol. 15 No. 3 pp. 227–235, 1996) and D. G. Aliaga (Visualization of complex models using dynamic texture-based simplification, *Proceedings of Visualization 96*) all used a single texture polygon. These image-based primitives are view-dependent and form a compact representation; thus they have the potential to be more appropriate in applications which also need to sustain a user-specified communication bandwidth.

S. Eric Chen and L. Williams (View interpolation for image synthesis, Computer Graphics (*SIGGRAPH '93 Proceedings*), pp. 279–288, August 1993) and T. Kaneko and S. Okamoto (View interpolation with range data for navigation applications, *Computer Graphics International*, pp. 90–95, June 1996) generated novel images from a number of precalculated reference images by "view interpolation." Along with the images, corresponding maps are necessary so that one image can be morphed into another. The user can stroll through restricted paths connecting successive locations at which the precomputed views are stored, providing the sensation of continuous in-between views.

The advantage of view interpolation and any other image-based rendering technique is that the generation of a new image is independent of the scene complexity. The technique gives more freedom than strolling back and forth within a video sequence. However, it works well only if adjacent images depict the same object from different viewpoints. The interpolated views may introduce some distortions because linear interpolation does not ensure natural or physically valid in-between images. Recently, S. M. Seitz and C. R. Dyer (View morphing, Computer Graphics (*SIGGRAPH '96 Proceedings*)) proposed a new method, called "view morphing," which better preserves the in-between shape appearance. Image-based methods usually do not consider the underlying 3D model, and some inherent problems, known as holes and overlaps, need to be alleviated. In the paper by Kaneko and Okamoto cited above, a full range of data, acquired from a range scanner, is associated with each reference image. The exact range simplifies the generation of the in-between images. No correspondence is required, and overlaps are easily resolved by a Z-buffer approach. P. E. Debevec, C. J. Taylor and J. Malik (Modeling and rendering architecture from photographs: a hybrid geometry- and image-based approach, Computer Graphics (*SIGGRAPH '96 Proceedings*)) use a set of viewpoints to approximate the 3D model, and new views are then rendered from arbitrary viewpoints by a view-dependent texture-mapping technique.

SUMMARY OF THE INVENTION

According to the present invention there is provided, in a system in which a server and a client cooperate to render a plurality of views of a virtual world, each view corresponding to a viewpoint, a method for generating the views in real time, comprising the steps of: (a) transmitting a first reference view to the client; (b) transmitting at least a portion of a model to the client; (c) extrapolating said first reference view, based on said at least portion of said model, thereby providing an extrapolated view; (d) transmitting at least one correction dataset to the client; and (e) correcting said extrapolated view based on said at least one correction dataset, thereby providing at least one second reference view.

According to the present invention there is provided, in a system in which a server and a client cooperate to render a plurality of views of a virtual world, a method for updating the views in real time, comprising the steps of: (a) transmitting a first reference view to the client; (b) extrapolating said first reference view, thereby providing an extrapolated view; (c) transmitting at least one correction dataset to the client; and (d) correcting said extrapolated view based on said at least one correction dataset, thereby providing at least one second reference view, wherein said extrapolating is effected at least twice before said correcting.

The present invention is based on a new paradigm for interaction with complex virtual worlds, on a network such as the world wide web, which uses both the client and the server simultaneously. The client generates (extrapolates) the new views based on the locally available data, while the server transmits only the data necessary to prevent an accumulation of errors. The "polygon-assisted" compression introduced by Marc Levoy (Polygon-assisted JPEG and MPEG compression of synthetic images, Computer Graphics (*SIGGRAPH '95 Proceedings*), pp. 21–28, August 1995) was previously suggested to partition the rendering task between the server and the client. The client renders a low-quality image and receives from the server the compressed difference between the high-quality image and the low-quality image. This requires the transmission of the difference image for every frame, in contrast to the present invention, wherein the client can generate several frames autonomously.

The present invention is based on the principle of view interpolation discussed above. It enables the user to have a smooth "exploration" of the virtual environment in which (s)he is traveling. However, the present invention does not interpolate between precomputed views, but "extrapolates" the last reconstructed reference view towards the new view.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
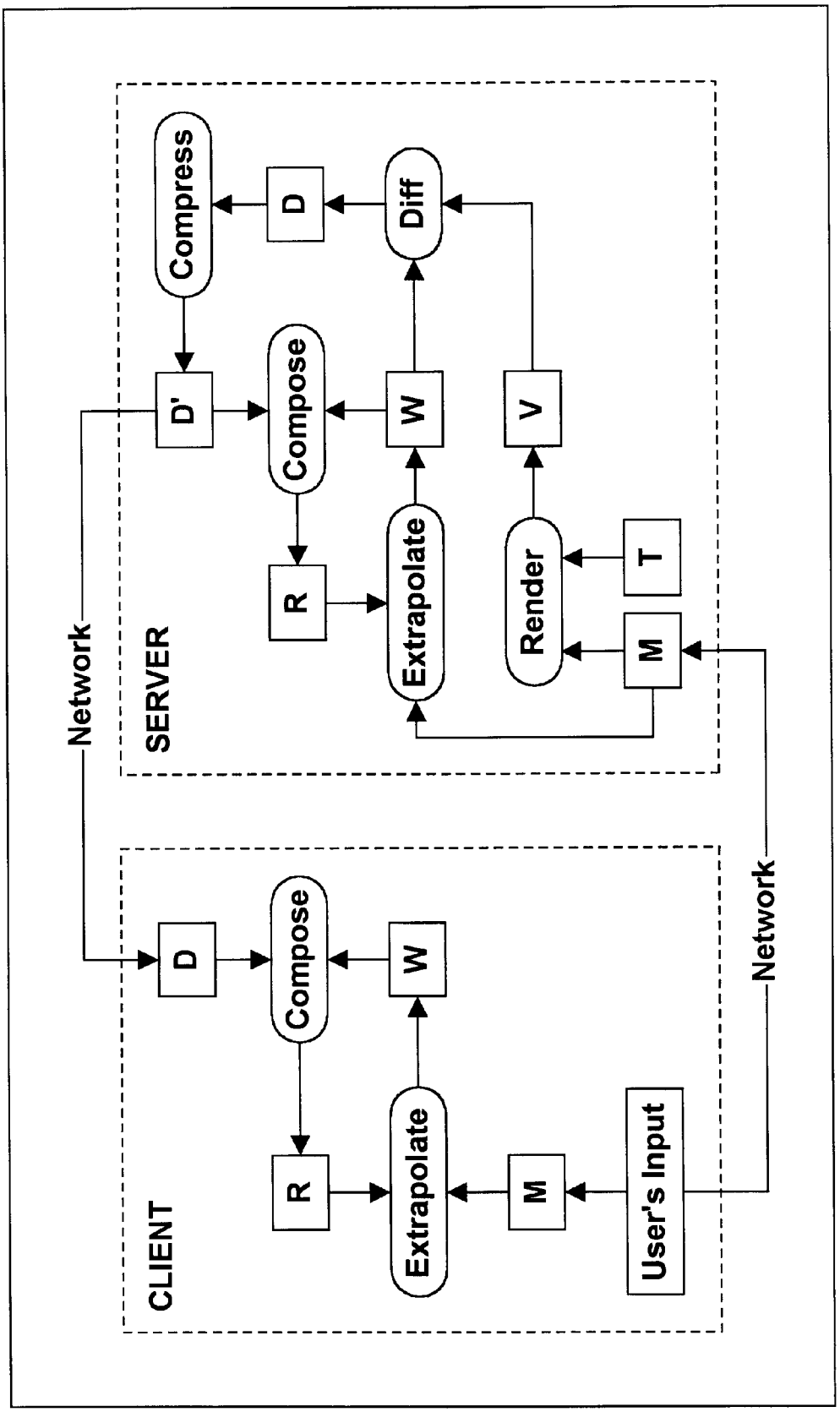
FIG. 1 is a flow diagram of the model-based extrapolation scheme.

The present invention is of a method for rendering views of a virtual reality world, at the client of any interactive client-server network, from the full world wide web to even a simple communication line, fast enough to preserve the illusion of virtual reality.

Consider an interactive web system in which the user roams in a remote virtual environment. According to the present invention, the client extrapolates the new views based on the locally available data, which include previous images, camera position and range data. Because the client cannot extrapolate the exact new view, the server needs to transmit to the client a correction dataset, for example, a difference image, representing the difference between the client approximated view and the exact new view. The correction dataset is better compressed and reduces the network transmission volume. Moreover, the server does not need to correct the client-extrapolated view in every frame, but at lower frequencies than the client frame rate, to further reduce the network requirements. A novel view R+i is an extrapolation of a reference view R. The server needs to transmit correction datasets to guarantee that the reference view is sufficiently close to the current frame to improve the quality of the extrapolated views. Because the transmitted data do not necessarily reconstruct the current view, no latency occurs.

The extrapolation of the novel view is based on a model-based backprojection technique. Maneesh Agrawala, Andrew Beers and Navin Chaddha (Model-based motion estimation for synthetic animations, *Proc. ACM Multimedia* '95) and D. S. Wallach, S. Kunapalli and M. F. Cohen (Accelerated MPEG compression of dynamic polygonal scenes, *Computer Graphics* (*SIGGRAPH '94 Proceedings*), pp. 193–197, July 1994) used model-based techniques for synthetic animations to guide the motion estimation for block-based video compression algorithms. These techniques show that a model-based approach significantly improves the exploitation of inter-frame coherence. In the view extrapolation scheme, the motion compensation is computed by the client and need not be transmitted. Only the difference values need to be transmitted. In terms of network requirements, this guarantees a higher bitrate compression (lower bandwidth requirement) or higher image quality.

The virtual environment consists of textured models stored at the server. The model of the relevant parts is transmitted to the client according to its relative position within the viewer. The transmitted model includes only its geometry and no textures. (It should be emphasized that the texture-space can be significantly larger than the geometry-space.) The transmitted model may include all or only part of the geometry of the true model, or may be an approximation of the geometry of all or part of the true model. The 3D model does not need to be constantly transmitted over the network, but can be transmitted incrementally, and is dynamically transformed by the client. The server only transmits the model data when new models enter the viewing frustrum or when a new level of detail of an existing model is required.

Referring now to the drawings, FIG. 1 is a block diagram of the modelbased extrapolation scheme of the present invention. The scheme is initialized by the transmission from the server to the client of both the portion M of the model that is needed to reconstruct the view of the virtual reality world from the client's initial viewpoint, and an exact reference view R from that viewpoint. The user navigates through the virtual reality world by entering coordinates of new viewpoints. Both the client and the server transform model M to the new viewpoints. The transformed model M is combined with reference view R, as described below, to provide an extrapolated view W. This also is done by both the client and the server. Meanwhile, the server computes exact views V that correspond to the new viewpoints, using the full model as well as texture T. As needed, the server computes correction datasets and transmits them to the client, which used the correction datasets to correct reference view R. According to the embodiment of the present invention depicted in FIG. 1, the correction dataset is the difference D between an exact view V and a corresponding extrapolated view W: D=V−W. D is transmitted to the client and composed with W (in this embodiment by adding D to W) to give an updated reference view R. Again, this composition is done by both the client and the server, so that the server always has available to it the state of the client. Optionally, as shown in FIG. 1, the server compresses D to a compressed difference image D' before transmission to the client. If a lossy compression such as JPEG is used, then the new reference view R is only an approximation of V. If a lossless compression is used, then the new R is identical to V.

Also as needed, additional portions of the model are transmitted from the server to the client, so that the client always has as much of the model as it needs to extrapolate to new viewpoints.

The extrapolation scheme of the present invention is in a sense similar to MPEG compression technology. An MPEG video stream consists of intra frames (I), predictive frames (P) and interpolated frames (B). The I frames are coded independently of any other frames in the sequence, while the P and B are coded using motion estimation and interpolations. The P and B frames are substantially smaller than the I frames. The motion estimation of a P frame is based on preceding frames as well as successive frames. According to the present invention, successive frames are not available, and instead of the P and B frames, only extrapolated frames W are used.

Figure 2:
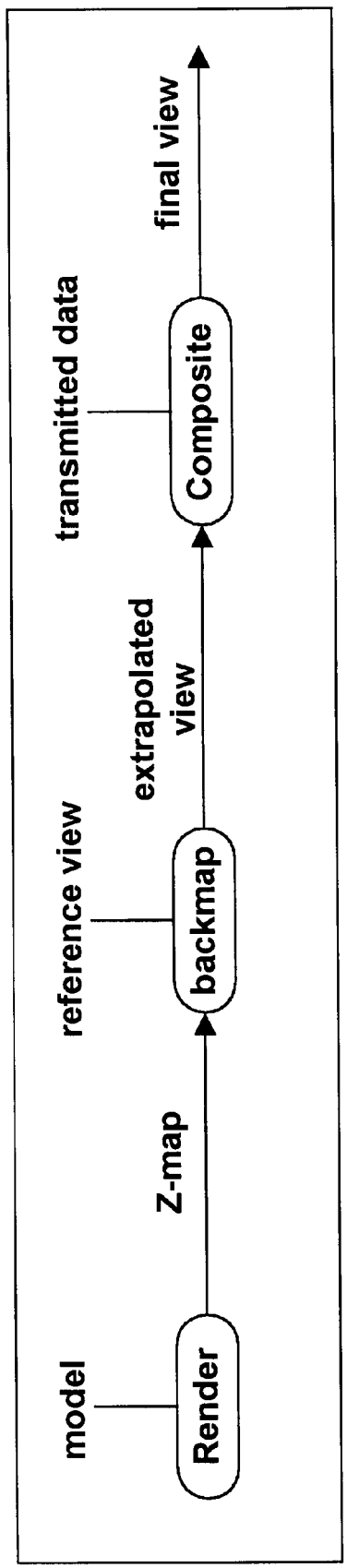
FIG. 2 is a flow diagram of novel view generation.

FIG. 2 is a flow diagram of the generation of a novel view according to the present invention. This is done in three steps. The first stop renders model M to create a Z-map. The second step generates extrapolated view W by backprojecting to reference view R. The third step corrects warped view W using the transmitted data, including the correction dataset. As noted above, the third step is performed only as needed, and not necessarily in every cycle.

The embodiment of the invention described herein uses only one reference view for view extrapolation, and uses a difference image as a correction dataset. It will be appreciated that these are not inherent limitations of the invention. The scope of the invention includes other kinds of correction datasets, and extrapolation based on several reference views, as will be obvious to one ordinarily skilled in the art.

While the invention has been described with respect to a limited number of embodiments, it will be appreciated that many variations, modifications and other applications of the invention may be made.

What is claimed is:

1. In a system in which a server and a client cooperate to render a plurality of views of a virtual world, each view corresponding to a viewpoint, a method for generating the views in real time, the method comprising:
   (a) transmitting a first reference view to the client;
   (b) transmitting at least a portion of a virtual world model to the client;
   (c) extrapolating said first reference view based on said portion of said virtual world model to generate an extrapolated view;
   (d) transmitting at least one correction dataset to the client; and
   (e) correcting said extrapolated view based on said at least one correction dataset to generate at least one second reference view.

2. The method of claim 1, wherein said extrapolating comprises:
   (i) transforming said virtual world model to the viewpoint of said extrapolated view;
   (ii) rendering said virtual world model; and
   (iii) backprojecting said virtual world model to said first reference view.

3. The method of claim 1, further comprising:
   (f) rendering an exact view, by the server; and
   (g) subtracting said extrapolated view from said exact view to generate a difference image for use as said at least one correction dataset.

4. The method of claim 3, further comprising:
   (h) compressing said difference image.

5. The method of claim 1 further comprising:
   (f) replacing said first reference view with said at least one second reference view.

6. The method of claim 1, wherein said correction dataset includes a difference image.

7. In a system in which a server and a client cooperate to render a plurality of views of a virtual world, a method for updating the views in real time, the method comprising:
   (a) transmitting a first reference view to the client;
   (b) extrapolating said first reference view, to generate an extrapolated view;
   (c) transmitting at least one correction dataset to the client; and
   (d) correcting said extrapolated view based on said at least one correction dataset, to generate at least one second reference view;
   wherein said extrapolating occurs at least twice before said correcting.

8. The method of claim 7, further comprising:
   (e) rendering an exact view, by the server; and
   (f) subtracting said extrapolated view from said exact view to generate a difference image for use as said at least one correction dataset.

9. The method of claim 8, further comprising:
   (g) compressing said difference image.

10. The method of claim 7, further comprising:
    (e) replacing said first reference view with said at least one second reference view.

11. The method of claim 7, wherein said correction dataset includes a difference image.

12. The method of claim 1, wherein said extrapolating of said first reference view is performed a plurality of times to generate a plurality of extrapolated views, and wherein said correcting is performed on only a portion of said plurality of extrapolated views.

13. In a system for rendering a plurality of views, each of the views associated with a viewpoint, a method for reconstructing at least one of the plurality of views, the method comprising:

(a) providing one or more reference views;
(b) providing range data;
(c) extrapolating said one or more reference views based on said range data and on at least one of the viewpoints to generate at least one extrapolated view;
(d) providing at least one correction dataset; and
(e) correcting said at least one extrapolated view based on said at least one correction dataset to generate at least one new reference view.

14. The method of claim 13, wherein for at least one of said reference views, said extrapolating is performed a plurality of times to generate plurality of extrapolated views, wherein only a portion of said plurality of extrapolated views are corrected.

15. The method of claim 13, wherein said range data is provided as part of a geometric model.

16. The method of claim 13 further comprising:
(f) adding said new reference view to said one or more reference views.

17. The method of claim 13, wherein said extrapolating includes motion compensation.

18. The method of claim 17, wherein said motion compensation includes backprojection.

19. The method of claim 13, wherein said correction dataset comprises a difference between an exact view and said extrapolated view.

20. The method of claim 19, further comprising:
(f) rendering said exact view, based on a virtual reality world.

21. The method of claim 13, further comprising
(f) compressing said correction dataset.

22. The method of claim 21, wherein said compressing comprises using a lossy compression.

23. The method of claim 22, wherein said lossy compression is JPEG.

24. The method of claim 13, wherein only enough of said range data is provided to enable said extrapolating.

25. The method of claim 13, wherein said plurality of views are rendered cooperatively by a sender and a receiver.

26. The method of claim 25, wherein said providing of said one or more reference views, said providing of said range data, and said providing of said at least one correction dataset comprise sending said one or more reference views, said range data and said at least one correction dataset from said sender to said receiver.

27. The method of claim 25, wherein said extrapolating and said correcting are performed both by said sender and by said receiver.

28. The method of claim 25, wherein said receiver includes a client that includes a virtual camera, said at least one viewpoint being provided by said virtual camera, said range data being provided in accordance with said at least one viewpoint.

29. The method of claim 28, wherein said range data is included in a portion of a geometric model sent from said sender to said receiver, said portion of said geometric model being selected according to said at least one viewpoint.

30. The method of claim 28, wherein said range data is included in a portion of a geometric model sent from said sender to said receiver, said portion of said geometric model being selected according to a required level of detail.

31. The method of claim 25, wherein said sender includes a server and wherein said receiver includes a client, said server and said client being connected via a network.

32. The method of claim 31, further comprising:
(f) establishing at least one of the viewpoints, by said client.

33. The method of claim 32, further comprising:
(g) providing said at least one viewpoint to said server, by said client; and
(h) determining said at least one correction dataset based on said at least one viewpoint, by said server.

34. The method of claim 32, wherein said establishing of said at least one viewpoint is performed in accordance with user navigation.

35. In a network comprising a client and a server, a method performed at the client of rendering views of a virtual world, the method comprising:
generating an extrapolated view of the virtual world based on a reference view of the virtual world and on at least a portion of a virtual world model;
receiving from the server a correction dataset defining a difference between the extrapolated view of the virtual world and an exact view of the virtual world maintained at the server; and
modifying the extrapolated view based on the received correction dataset to generate an updated reference view to be used for generating subsequent extrapolation views of the virtual world.

36. The method of claim 35 in which generation of the extrapolated view of the virtual world is based at least in part on range data received from the server.

37. The method of claim 35 further comprising receiving from the server the virtual world reference view or the virtual world model portion or both.

38. In a network comprising a client and a server, a method performed at the server to facilitate rendering views of a virtual world at the client, the method comprising:
maintaining an exact view of the virtual world based on a virtual world model and a texture map residing at the server;
maintaining an extrapolated view of the virtual world based on a reference view and a subset of the virtual world model known to the client; and
transmitting to the client a correction dataset defining a difference between the extrapolated view of the virtual world and an exact view of the virtual world.

39. The method of claim 38 in which maintenance of the exact and extrapolated view s of the virtual world is based at least in part on user-input received from the client.

40. The method of claim 39 in which the user-input received from the client corresponds to a user's viewpoint in the virtual world.

41. The method of claim 38 further comprising updating the reference view based on the correction dataset transmitted to the client.

42. The method of claim 41 further comprising generating subsequent extrapolated views based on the update reference view.

43. The method of claim 38 in which maintenance of the extrapolated view at the server comprises emulating a corresponding maintenance of an extrapolated view at the client.

44. Computer software, residing on a computer-readable medium, for rendering views of a virtual world in a network comprising a client and a server, the software comprising instructions for causing the client to perform the following operations:
generate an extrapolated view of the virtual world based on a reference view of the virtual world and on at least a portion of a virtual world model;
receive from the server a correction dataset defining a difference between the extrapolated view of the virtual world and an exact view of the virtual world maintained at the server; and modify the extrapolated view based on the received correction dataset to generate an updated reference view to be used for generating subsequent extrapolation views of the virtual world.

45. Computer software, residing on a computer-readable medium, for rendering views of a virtual world in a network comprising a client and a server, the software comprising instructions for causing the server to perform the following operations:

maintain an exact view of the virtual world based on a virtual world model and a texture map residing at the server;

maintain an extrapolated view of the virtual world based on a reference view and a subset of the virtual world model known to the client; and transmit to the client a correction dataset defining a difference between the extrapolated view of the virtual world and an exact view of the virtual world.

* * * * *